United States Patent [19]
Lee et al.

[11] Patent Number: 6,147,955
[45] Date of Patent: Nov. 14, 2000

[54] OPTICAL PICKUP DEVICE TO READ FROM AND RECORD INFORMATION TO DISKS OF DIFFERENT THICKNESSES

[75] Inventors: Chul-woo Lee; Jang-hoon Yoo, both of Seoul, Rep. of Korea

[73] Assignee: Samsung Electronics Co., Ltd., Suwon, Rep. of Korea

[21] Appl. No.: 09/291,031

[22] Filed: Apr. 14, 1999

Related U.S. Application Data

[63] Continuation of application No. 08/933,249, Sep. 18, 1997, Pat. No. 5,909,424, which is a continuation of application No. 08/779,521, Jan. 7, 1997, abandoned.

[30] Foreign Application Priority Data

Feb. 14, 1996 [KR] Rep. of Korea .......................... 96-3603

[51] Int. Cl.[7] ........................................................ G11B 7/00
[52] U.S. Cl. .............................................. 369/112; 369/118
[58] Field of Search ..................................... 369/112, 118, 369/103, 109, 58, 44.26, 44.23, 44.14, 94; 359/19

[56] References Cited

U.S. PATENT DOCUMENTS

| | | | |
|---|---|---|---|
| 5,161,040 | 11/1992 | Yokoyama et al. | 359/19 |
| 5,235,581 | 8/1993 | Miyagawa et al. | 369/44.12 |
| 5,303,221 | 4/1994 | Maeda et al. | 369/112 |
| 5,446,565 | 8/1995 | Komma et al. | 359/19 |
| 5,659,533 | 8/1997 | Chen et al. | 369/112 |
| 5,665,957 | 9/1997 | Lee et al. | 250/201.5 |
| 5,724,335 | 3/1998 | Kobayashi | 369/112 |
| 5,777,973 | 7/1998 | Yoo et al. | 369/109 |
| 5,796,683 | 8/1998 | Sumi et al. | 369/13 |

FOREIGN PATENT DOCUMENTS

| | | | |
|---|---|---|---|
| 7-302437 | 11/1995 | Japan | 369/112 |

*Primary Examiner*—Tan Dinh
*Attorney, Agent, or Firm*—Staas & Halsey

[57] ABSTRACT

An optical pickup device which is efficient in light use having little spherical aberration. The optical pickup device of an optical pickup includes an objective lens, disposed opposite a disk, having a light passing region divided into central, intermediate and periphery regions corresponding to a near axis area, an intermediate axis area and a far axis area of incident light, where the curvature of the central and peripheral regions is optimized for a thin disk and that of the intermediate region is optimized for a thick disk; a light source irradiating light toward a disk through the objective lens; a photo detector for detecting light reflected from the disk; and a beam splitter, disposed between the objective lens and the light source, for transmitting light from the light source toward the objective lens and for diffracting light reflected from the disks toward the photo detector. Therefore, the optical pickup device can be used for both compact disks (CDs) that are thick using light beam passing the near and intermediate regions of said objective lens, and digital video disks (DVDS) that are thin using light beam passing the near and far axis regions of said objective lens, and detect signals without picking up noise regardless of the thickness of the disk.

7 Claims, 4 Drawing Sheets

FIG. 4
FIG. 5
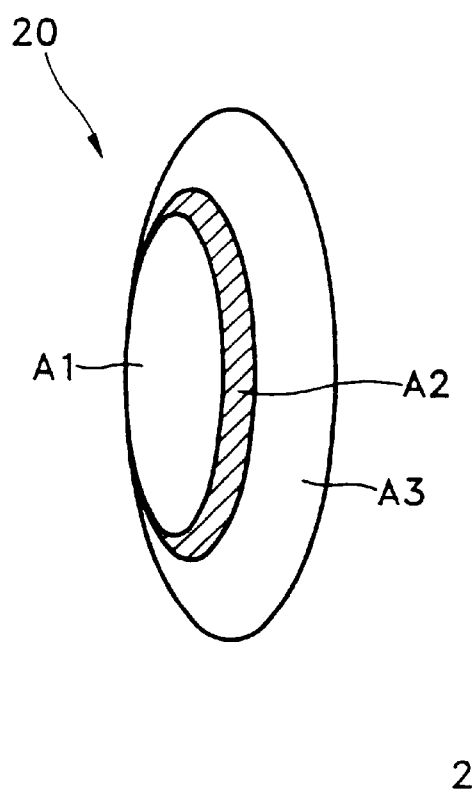
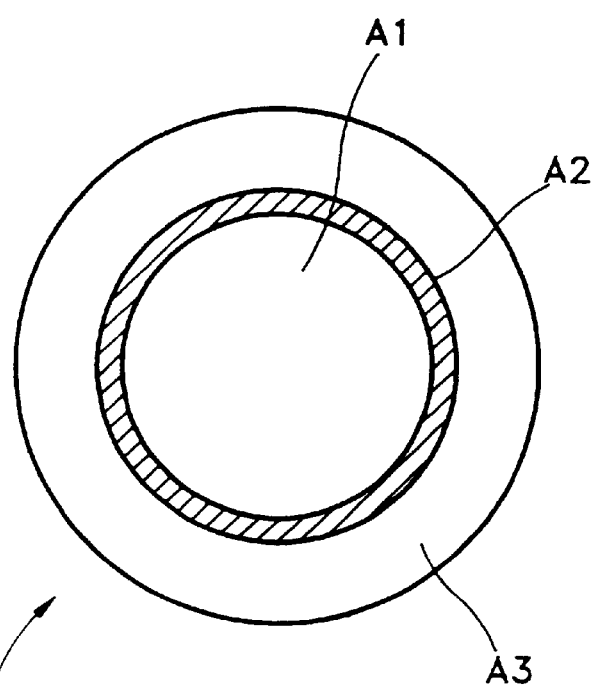

——— REPRODUCTION FROM THIN DISK
----- REPRODUCTION FROM THICK DISK

OPTICAL PICKUP DEVICE TO READ FROM AND RECORD INFORMATION TO DISKS OF DIFFERENT THICKNESSES

This application is a Continuation of Ser. No. 08/933,249, filed Sep. 18, 1997, and now is U.S. Pat. No. 5,909,424, which is a Continuation of Ser. No. 08/779,521, filed Jan. 7, 1997.

BACKGROUND OF THE INVENTION

1. Field of the Invention

The present invention relates to an optical pickup device which is applied to an optical pickup apparatus, and more particularly, to an optical pickup device which enables reading out of information from optical disks having different thicknesses and enables recording information thereon.

In the optical pickup, an objective lens faces a recording surface of an optical disk for focusing light to record information onto the recording surface of the disk or receiving light reflected from the surface of the disk to read information.

2. Description of the Related Art

Recently, research on an optical drive has been conducted in which the drive can seat disks having different thicknesses by adopting a lens device including both a hologram lens and a refractive lens.

FIGS. 1 and 2 show focusing states of a conventional optical pickup device of light incident by zero order diffracted light and 1st order diffracted light on a thin disk and a thick disk, respectively. A refractive lens 2 and a hologram lens 1 are disposed in sequence along an optical path from each of disks 3a and 3b. The hologram lens 1 has a lattice pattern 11 for diffracting light that passes through the hologram lens 1. Thus, while light 4 emitted from a light source (not shown) passes through the hologram lens 1, light is divided into a diffracted 1st order light 41 and a non-diffracted zero order light 40, respectively. While the diffracted 1st order light 41 and the non diffracted zero order light 40 pass through each of the objective lenses 2, the light 41 and 40 are focused with different intensities, thereby forming a focus on the thin disk 3a and on the thick disk 3b.

The lens device described above can record information on disks having different thicknesses and read out information therefrom using zero order light and 1st order light. However, as the incident light is divided into zero order light and 1st order light, the efficiency of light use is lowered. That is, since the incident light is divided into zero order light and 1st order light by the hologram lens 1, the actual amount of light used for recording information is only 150%. Also, when information is reproduced, information is included in only one of zero order light and 1st order light. Thus, 1st order light or zero order light without information is detected by a photo detector and the detected light may produce noise. The above problem can be overcome by processing the hologram lens of the lens device. However, this requires a high precision process of etching a fine pattern on the hologram, thereby increasing the manufacturing cost.

SUMMARY OF THE INVENTION

It is an object of the present invention to provide an optical pickup device wherein parts thereof can be manufactured and assembled easily at low cost.

It is another object of the present invention to provide an optical pickup device which has high efficiency of light use and low spherical aberration.

To achieve the above and other objects, there is provided an optical device comprising a light source; an objective lens facing a disk having a light passing region divided into central, intermediate and periphery regions respectively corresponding to a near axis area, an intermediate axis area and a far axis area of incident light, wherein the curvature of the central and peripheral regions are optimized for a thin disk and that of the intermediate region is optimized for a thick disk; a photo detector for detecting light reflected from the disk; a beam splitter, disposed between the objective lens and the light source, for transmitting/reflecting light from the light source toward the objective lens and for reflecting/transmitting light reflected from the disks toward the photo detector.

BRIEF DESCRIPTION OF THE DRAWINGS

The above and other objects and advantages of the present invention will become more apparent by describing in detail a preferred embodiment thereof with reference to the attached drawings in which:

FIGS. 4 and 5 are perspective and front views of an objective lens adopted into the optical pickup device according to the present invention;

DETAILED DESCRIPTION OF THE INVENTION

According to an optical pickup device of the present invention, to prevent the generation of spherical aberration from light of an intermediate area when information is reproduced from a thick disk, such that the intermediate area is located between a near area and a far area relative to a central optical axis, the curvature of an intermediate region corresponding to the intermediate area of the light is optimized with respect to the thick disk. Also, the light receiving area of a photo detector is limited so that light of the far axis area cannot be reached thereto when information is reproduced from the thick disk.

Here, the near axis area represents an area around a central axis of the lens with negligible aberration. Also, the far axis area represents an area relatively far from the optical axis compared with that of the near axis area, and the intermediate area represents an area between the near and far axis areas.

Figure 1:
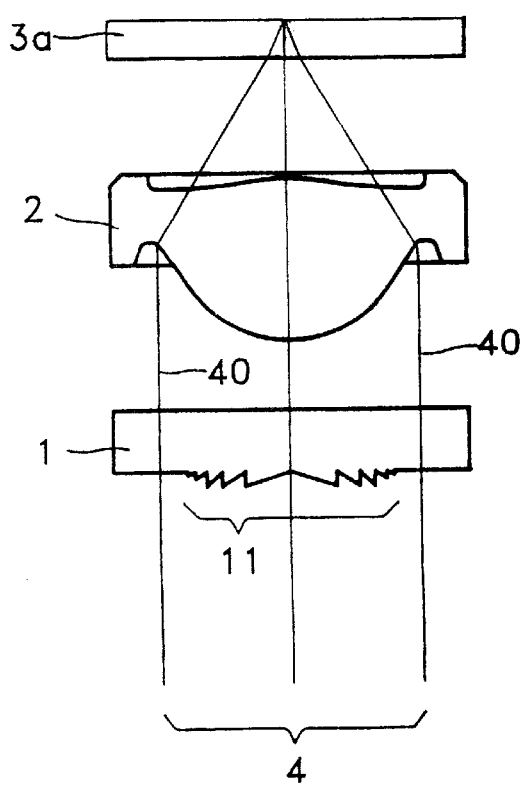
FIG. 1 is a schematic diagram of a conventional lens device having a hologram lens focusing on a thin disk.
Figure 2:
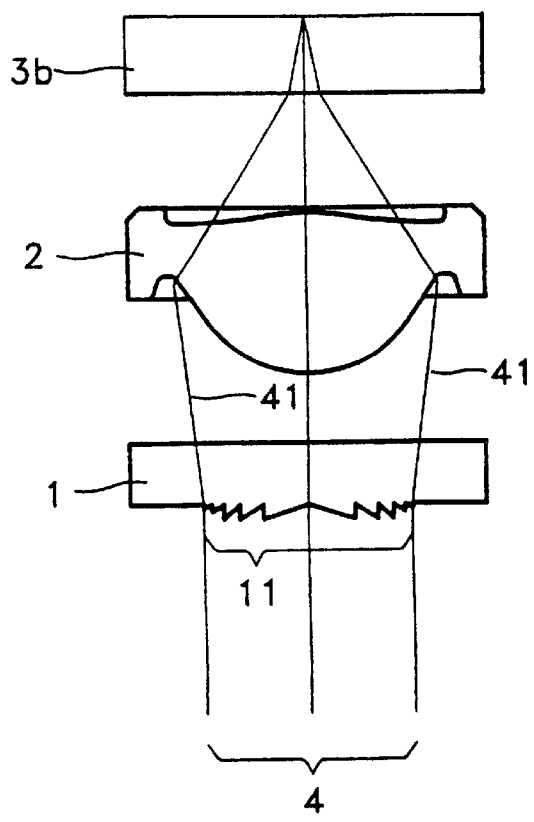
FIG. 2 is a schematic diagram of the lens device of FIG. 1 focusing on a thick disk.
Figure 3:
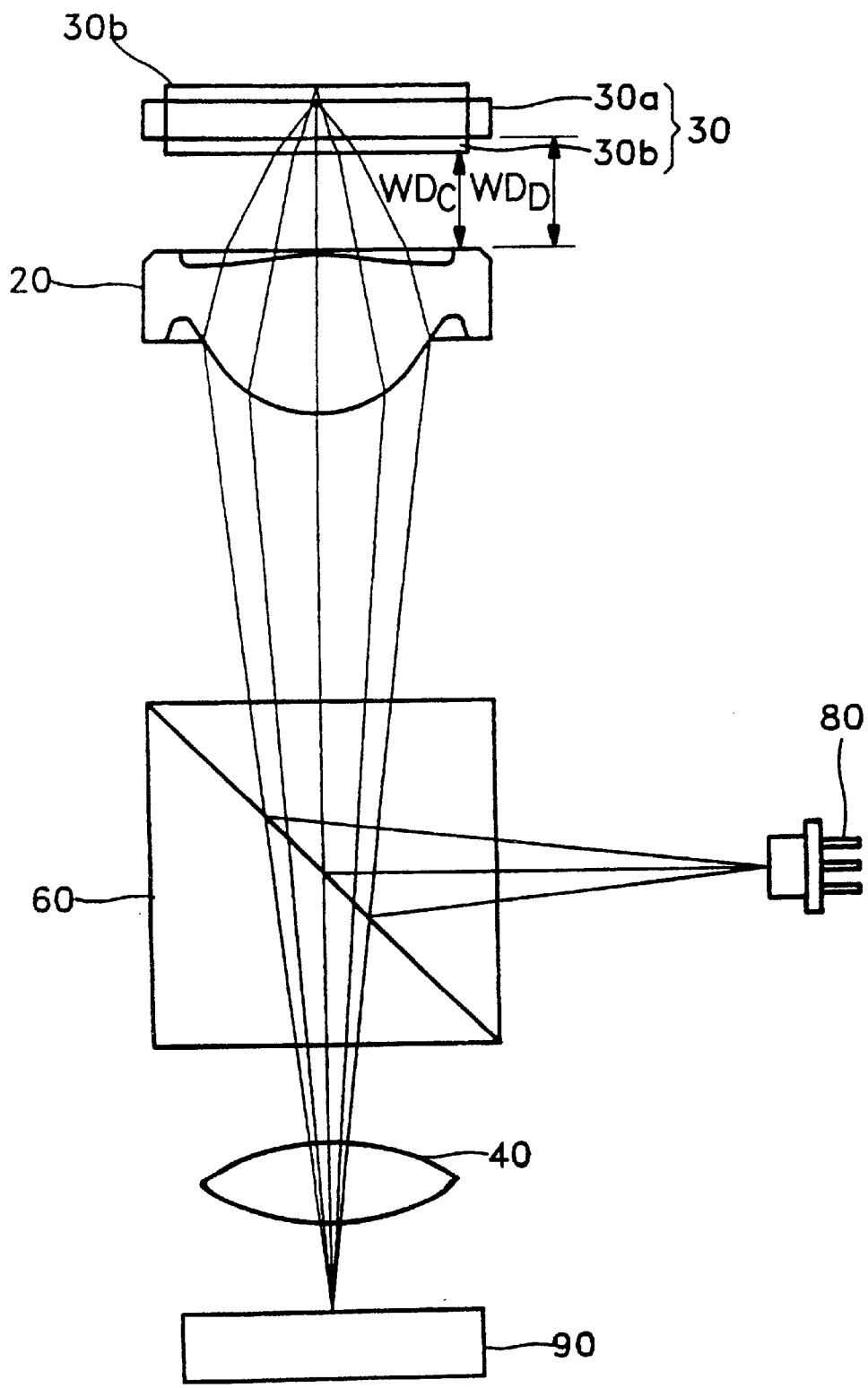
FIG. 3 is a schematic diagram of an optical pickup device according to the present invention.

FIG. 3 is a schematic diagram of an optical pickup device according to the present invention. Like a general optical pickup device, an objective lens 20, a beam splitter (separation unit) 60 and a detecting lens 40 are disposed in sequence on an optical path between a disk 30 and a photo detector 90, and a light source 80 is located on another optical path from the beam splitter 60. The disk 30 may either be a thin (digital video) disk 30a or a thick (compact) disk 30b.

In the optical pickup device having the above structure according to the present invention, FIGS. 4 and 5 show perspective and front views of the objective lens 20, respectively. The reference symbol $WD_D$ denotes the distance between the objective lens 20 and the thin disk 30a, and $WD_C$ denotes the distance between the objective lens 20 and the thick disk 30b. That is, in a reading or writing operation, the working distance for the thin disk 30a is larger than that for the thin disk 30b.

The objective lens 20 has a doughnut- or ring-shaped intermediate region A2 on at least one side, having an outer diameter which is less than the total significant light passing area diameter. Also, a central region A1 and a periphery region A3 are placed inside and outside of the intermediate region A2, respectively. Here, the curvatures of the central and peripheral regions A1 and A3 are optimized for a thin digital video disk (DVD), and that of the intermediate region A2 is optimized for a thick compact disk (CD). Also, depending on circumstances, the intermediate region A2 may be divided into a plurality of subregions. Preferably, the photo detector 90 is designed for only receiving light passed through the central and intermediate regions A1 and A2 of the objective lens 20 when information is reproduced from the thick disk, in which light of the far axis area is not detected by the photo detector 90. The central region A1 is a circular region, the intermediate region A2 is a first disk-shaped region and the periphery region A3 is a second disk-shaped region.

Figure 6:
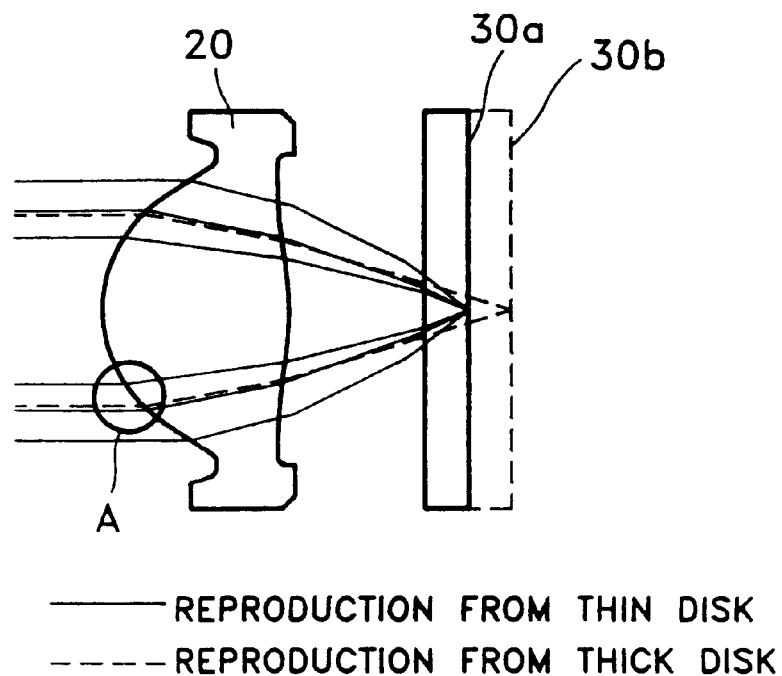
FIG. 6 is a diagram showing an optical path through the objective lens of the optical pickup device according to the present invention.
Figure 7:
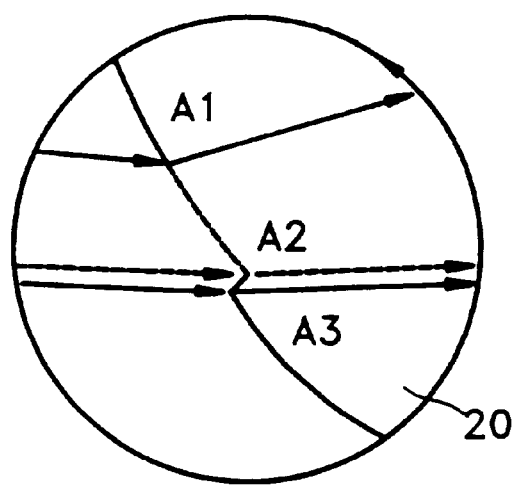
FIG. 7 is a magnified view of portion A in FIG. 6.

Thus, as shown in FIGS. 6 and 7, when information is reproduced from the thick CD 30b, only light inside the dashed line is focused on the thick CD 30b. Here, since light of the near axis area passes through the objective lens, less spherical aberration is generated, even though the curvature of the central region A1 corresponding to the near axis area is optimized for the thin DVD 30a. Also, when reproducing information from the thin DVD 30a, light passes through the central and peripheral regions A1 and A3 whose curvature is optimized for the thin disk, thereby forming a focus on a surface including information of the thin disk 30a.

When a numerical aperture (NA) of the regions corresponding to the near and intermediate axis areas is less than 0.4, a small focus can be formed on the thick CD 30b, wherein the small focus is optimized for the CD disk. According to experimentation, it is preferable that the width of the ring-shaped intermediate region is greater than 50 μm from the thin DVD 30 a for a stable reproducing characteristic. Also, the data of the objective lens 20 for each region which is optimized for the CD and DVD are summarized in Tables 1 and 2, respectively.

Table 1 shows lens data at the intermediate region which is optimized for the thick CD 30b, and Table 2 shows lens data at the central and periphery regions A1 and A3 optimized for a thin DVD 30a. In these tables, the references to "front," "back," and "disk" represent the front surface of the objective lens 20, the back surface of the objective lens 20 and the surface of the disk, respectively. That is, in Table 1, the data for the curved surfaces "front," "back," and "disk" refer to the data of the front surface of the objective lens 20 at the intermediate region, the back surface of the lens at the intermediate region A2, and the surface of the thick CD 30b, respectively, and in Table 2, the data for the curved surfaces "front," "back," and "disk" refer to the data of the front surface of the objective lens 20 at the central and periphery regions A1 and A3, the back surface of the objective lens 20 at the central and periphery regions A1 and A3, and the surface of the thin DVD 30a, respectively.

As described above, according to the optical pickup device of the present invention, the thick CD and the thin DVD can be compatibly adopted and a signal can be detected without picking up noise regardless of the thickness of the disk. Also, the objective lens can be manufactured easily by a general compression or injection molding, thereby reducing manufacturing costs.

TABLE 1

Data at the intermediate region of the objective lens

| Curved Surface | Curvature | Thickness | Refractive Index | Aspherical Coefficient |
|---|---|---|---|---|
| front | 2.40632 | 2.600000 | 1.505 | K = 0.00000<br>A = −3.51258E−03<br>B = −6.19938E−04<br>C = −2.32191E−04<br>D = 0.00000 |
| back | −5.11700 | 1.563295 | 1.580 | K = −24.72000<br>A = 4.46350E−03<br>B = −3.69750E−03<br>C = 8.23880E−04<br>D = −7.45950E−05 |
| disk | ∞ | 1.200000 | 1.550 | Not Applicable |

TABLE 2

Data at the central and periphery regions

| Curved Surface | Curvature | Thickness | Refractive Index | Aspherical Coefficient |
|---|---|---|---|---|
| front | 2.09200 | 2.600000 | 1.505 | K = −0.872110<br>A = 4.79500E−03<br>B = 6.25260E−05<br>C = 1.24380E−05<br>D = −1.76880E−04 |
| back | −5.11700 | 1.563295 | | K = −24.72000<br>IC : Yes<br>CUF = 0.000000<br>A = 4.46350E−03<br>B = −3.69750E−03<br>C = 8.23880E−04<br>D = −7.45950E−05 |
| disk | ∞ | 0.600000 | 1.550 | Not Applicable |

What is claimed is:

1. An optical pickup device compatible with discs having different thicknesses, comprising:

a light source to emit a light beam;

an objective lens to focus the light beam on the discs having the different thicknesses to optimize optical aberration for a second one of the discs having a thickness greater than that of a first one of the disks; and a photo detector to detect the light beam reflected from the discs having the different thicknesses.

2. The optical pickup device as claimed in claim 1, wherein the objective lens has at least one region to focus the light beam onto the discs independent of the thicknesses of the discs.

3. The optical pickup device as claimed in claim 1, wherein a first working distance between the objective lens and a near surface of a first one of the discs having a first thickness is greater than a second working distance between the objective lens and a near surface of a second one of the discs having a second thickness greater than the first thickness.

4. An optical pickup device compatible with discs having different thicknesses, comprising:

an objective lens to focus a light beam on the discs having the different thicknesses, wherein the objective lens has a ring region;

wherein a first working distance between the objective lens and a near surface of a first one of the discs having a first thickness is greater than a second working distance between the objective lens and a near surface of a second one of the discs having a second thickness greater than the first thickness.

5. The optical pickup device as claimed in claim 4, wherein the ring region has a different optical characteristic from regions of the objective lens other than the ring region.

6. An optical pickup device compatible with discs having different thicknesses, comprising:

a light source to emit a light beam;

an objective lens to focus the light beam on the discs having the different thicknesses, wherein the objective lens has at least one region to focus the light beam onto the discs independent of the thicknesses of the discs; and a photodetector to detect the light beam reflected from the discs having the different thicknesses.

7. An objective lens for use in an optical device compatible with optical memory media of different thicknesses, said objective lens having at least one region which focuses light onto one of the optical memory media independent of the thickness of the one optical memory medium, wherein a first working distance between the objective lens and a near surface of a first one of the optical memory media having a first thickness is greater than a second working distance between the objective lens and a near surface of a second one of the optical memory media having a second thickness greater than the first thickness.

* * * * *